Dec. 22, 1964   J. H. A. HANSON   3,162,271
CORROSION RESISTANT DISC BRAKE
Filed Dec. 14, 1960   2 Sheets-Sheet 1

INVENTOR
John Harry Arthur Hanson
by Benj. T. Rauber
his attorney

Dec. 22, 1964    J. H. A. HANSON    3,162,271
CORROSION RESISTANT DISC BRAKE
Filed Dec. 14, 1960    2 Sheets-Sheet 2

INVENTOR
John Harry Arthur Hanson
by Benj. J. Rauber
his attorney

United States Patent Office 3,162,271
Patented Dec. 22, 1964

3,162,271
CORROSION RESISTANT DISC BRAKE
John Harry Arthur Hanson, New Cubbington, near Leamington, England, assignor to Dunlop Rubber Company Limited, London County, England, a British company
Filed Dec. 14, 1960, Ser. No. 75,715
Claims priority, application Great Britain, Jan. 1, 1960, 142/60
3 Claims. (Cl. 188—73)

In disc brakes the friction pads, which are usually mounted on metal backing plates, normally slide on metal guides towards and away from the braking disc.

Since, during braking a thrust is exerted on the pads, forcing them to bear against the guides, it is essential that the resistance to sliding of the pads on their guides when the brake is applied should be low.

The friction pads hitherto used in disc brakes are composed either of resin bonded asbestos containing friction and wear modifiers such as graphite, other carbonaceous products, metal chips, metal powders and fillers or of compressed metal powders acting as binders for non-metallic fillers such as graphite.

The guides are normally made of cast iron or steel protected against corrosion by plating with a metal such as cadmium or zinc.

When two or more materials capable of conducting electricity are held in contact with each other in the presence of an electrolyte a current can flow between them. The greater the potential difference the greater the current which can flow between the two materials. When the difference in potential becomes excessive, the material having the greater negative potential becomes anodic and dissolves in or reacts with the electrolyte producing undesirable corrosion products. Moisture from any source, e.g. rain, sea-water or condensation, acts as an electrolyte in the case of a disc brake.

When a friction pad contains inclusions such as graphite or metal chippings or powders and is held against a metal guide in the presence of an electrolyte, corrosion occurs at the interface trapping the corrosion products (which usually occupy a greater volume than the materials from which they were produced) between the pad and the guide. When a corroded brake is operated, it is necessary to exert a pressure greater than that normally required in order to overcome the resistance to sliding created by the corrosion. Similarly when a corroded brake has been applied for a long time and the pressure is then released, the resistance to sliding may be greater than that allowed for in the retracting device.

With a view to overcoming these disadvantages the invention provides a disc brake including friction pads slidable in contact with guides towards and away from the braking disc and in which the contacting surfaces of the pads and the guides are of materials which are inherently resistant to corrosion, which are not deleteriously affected by exposure to braking temperatures and which are unable to develop between them an electrolytic potential difference sufficient to cause corrosion. Preferably said materials are unable to develop between them an electrolytic potential exceeding 0.25 volt.

In one embodiment of the invention the guide contacting surfaces of the pads are free from inclusions capable of setting up an electrolytic potential between the pads and the guides sufficient to cause corrosion. Thus the guide contacting surfaces of the pads may be made of thermosetting resinous materials from which inclusions such as graphite, carbon, metals or other materials likely to set up electrolytic potential differences in excess of about .25 v., between the pads and the guides are excluded.

Again these surfaces of the pads may be constituted by a sheath preferably, but not necessarily, bonded to the pad, made of a substantially electrically inert material such as a ceramic material, glass or resin-bonded fibre. Again the sheath may consist of a metal such as cadmium plated mild steel, which when held against a cadmium plated iron or steel guide does not give rise to any potential difference. Similarly the sheath could be made of a suitable aluminium alloy.

When a metal sheath is used for the pad, the pad must be bonded to the sheath in order to prevent corrosion between the pad and the inside of the sheath although corrosion here would not affect the working of the pad and its sheath against the pad guide.

As a further alternative the guides may be made of or covered by a non-metallic electrically inert material.

By stating that the material is electrically inert we mean that it is unable to develop between itself and the contacting surface of the pad or guide, as the case may be, an electrolytic potential sufficient to induce corrosion.

It is also possible to use a double protection such as a sheathed pad in conjunction with an electrically inert pad guide. Thus it may be advantageous to use a pad with its guide contacting surfaces coated with thermosetting resinous material from which deleterious components such as graphite have been excluded, in conjunction with strips of glass bonded mica inserted into the brake caliper to form pad guides.

The particular system chosen will depend on the service conditions under which the brake is expected to operate, but it is of paramount importance that the materials used should be capable of operating effectively at the temperatures normally attained during braking and that they should be resistant to normal outdoor corrosive conditions.

Certain embodiments of the invention will now be described in further detail, by way of example, with reference to the accompanying drawings, in which.

Like reference numerals indicate like parts throughout the figures.

Figure 1:
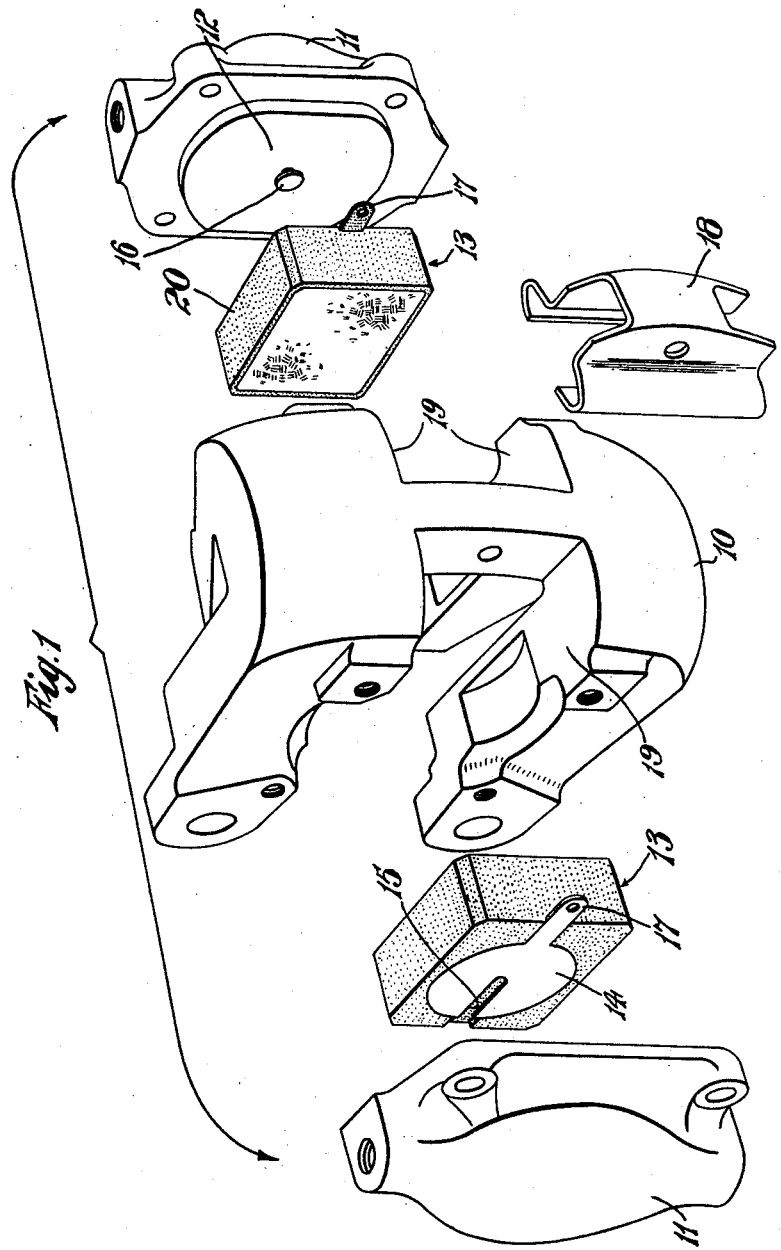
FIGURE 1 is an exploded view of a disc brake according to the invention.

The brake shown in FIGURE 1 includes a caliper 10 for embracing the braking disc (not shown) and having at each end a cylinder 11 containing a piston 12. Associated with each piston is a friction pad 13. Bonded to the rear face of each pad 13 is a cadmium plated metal backing plate 14 having a slot 15, which engages a pin 16 on the associated piston 12, and a perforated removal tag 17. The pads are normally retained in the caliper by a retainer 18 which is removed from the caliper when it is desired to replace the pads after they have worn. When fluid under pressure is admitted to the cylinders 11, the pads are moved inwardly towards the braking disc by the pistons 12 along guides 19 on the caliper.

Figures 2, 3, 4, 5:
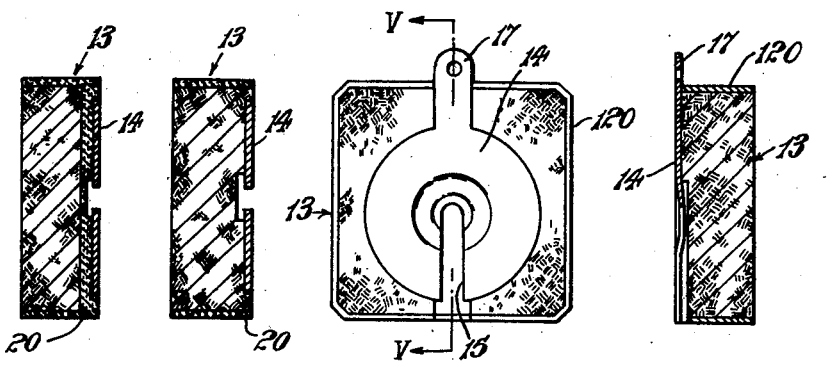
FIGURE 2 is a section through one of the friction pads.
FIGURE 3 is a section through an alternative form of friction pad.
FIGURE 4 is a rear view of another form of friction pad.
FIGURE 5 is a section on the line V—V in FIGURE 4.

In the construction shown in FIGURE 2, the pad 13 is sheathed at the sides and rear by an anti-corrosive or electrically inert material 20, e.g. a synthetic resin from which deleterious materials such as graphite have been excluded. This construction has the advantage of ease of manufacture, since the pad may first be entirely enclosed in the anti-corrosive material, which is afterwards machined off to expose the front braking face of the pad. Also it is desirable to provide anti-corrosive material between the rear face of the pad and the metal backing plate 14. However, the anti-corrosive sheathing material 20 may, if desired, be applied to the sides only of the pad as shown in FIGURE 3.

The pad shown in FIGURES 4 and 5 is similar to that of FIGURE 2, but in this case the anti-corrosive sheathing 120 of the pad is of stainless steel.

Figure 6:
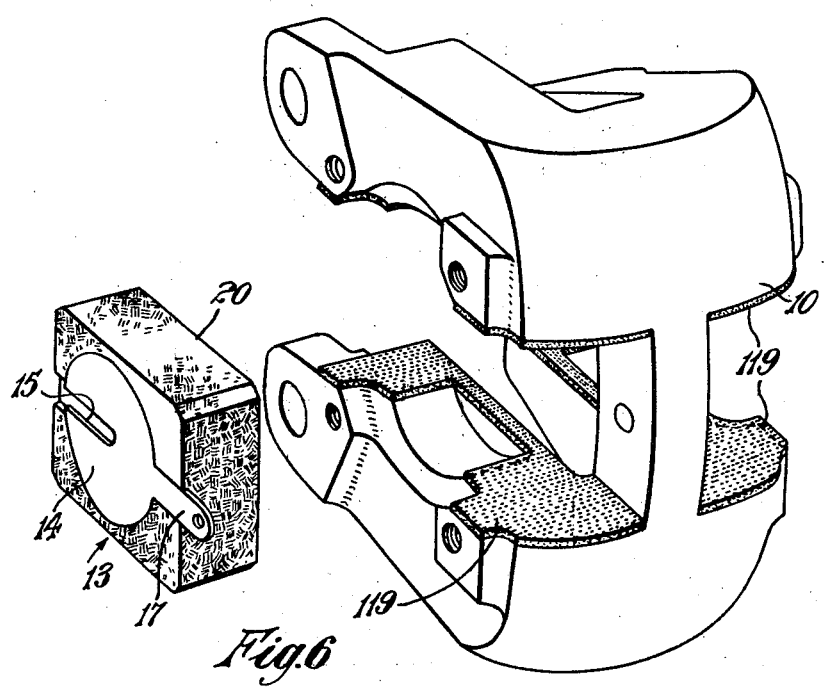
FIGURE 6 shows an alternative form of brake caliper and one of the associated friction pads.

In the construction shown in FIGURE 6 the guides 119 are of anti-corrosive material, e.g. glass bonded mica or thermosetting resin, and the pad 13 adapted to move therebetween is not covered with anti-corrosive material.

Having now described my invention, what I claim is:

1. A disc brake including friction pads slidable in contact with guides towards and away from the braking disc and in which the contacting surfaces of the pads and the guides are of materials which are inherently resistant to corrosion, which are not deleteriously affected by exposure to braking temperatures and which are unable to develop between them an electrolytic potential difference sufficient to cause corrosion and in which the material of said guides in contact with said pads is a non-metallic electrically inert material.

2. A disc brake including friction pads slidable in contact with guides towards and away from the braking disc and in which the guide contacting surfaces of the pads are covered wtih an electrically inert material of the class consisting of glass, ceramic material, and resin-bonded fiber.

3. A disc brake including friction pads slidable in contact with guides towards and away from the braking disc in which the contacting surfaces of the pads and the guides are of materials inherently resistant to corrosion at said contacting surfaces and in which the guide contacting surfaces of the pads are covered with an electrically inert material consisting of metal bonded to the pads.

References Cited by the Examiner

UNITED STATES PATENTS

| | | | |
|---|---|---|---|
| 1,254,344 | 1/18 | Murphy | 307—95 X |
| 1,867,984 | 7/32 | Pistor | 307—95 |
| 2,310,757 | 2/43 | Wagner | 307—95 X |
| 2,801,714 | 8/57 | Dotto | 188—152.873 |
| 2,856,034 | 10/58 | Mossey | 188—152.873 |

FOREIGN PATENTS 1,203,734   8/59   France.

ARTHUR L. LA POINT, *Primary Examiner.*

T. GRAHAM CRAVER, *Examiner.*